(12) United States Patent
Reponen et al.

(10) Patent No.: US 7,543,233 B2
(45) Date of Patent: Jun. 2, 2009

(54) DEVICE DREAM APPLICATION FOR A MOBILE TERMINAL

(75) Inventors: Erika Reponen, Tampere (FI); Jouka Mattila, Tampere (FI)

(73) Assignee: Nokia Corporation, Espoo (FI)

( * ) Notice: Subject to any disclaimer, the term of this patent is extended or adjusted under 35 U.S.C. 154(b) by 402 days.

(21) Appl. No.: 11/141,897

(22) Filed: Jun. 1, 2005

(65) Prior Publication Data

US 2006/0277467 A1    Dec. 7, 2006

(51) Int. Cl.
*G06F 3/00*    (2006.01)
(52) U.S. Cl. .................. 715/708; 715/714; 715/825; 706/46
(58) Field of Classification Search ............ 715/708, 715/714, 825
See application file for complete search history.

(56) References Cited

U.S. PATENT DOCUMENTS 6,842,877 B2 *    1/2005    Robarts et al. ............ 715/708

2003/0060728 A1 *    3/2003    Mandigo ............... 600/545
2005/0216859 A1 *    9/2005    Paek et al. ............... 715/810

OTHER PUBLICATIONS

Outlook, Microsoft Office Outlook, Copyright 2003, pp. 1-2.*
Screenshot of Outlook 2003 (1 page).

* cited by examiner

*Primary Examiner*—Steven P Sax
*Assistant Examiner*—Andrey Belousov
(74) *Attorney, Agent, or Firm*—Alston & Bird LLP

(57) ABSTRACT

The invention provides a method, computer program product and device for generating a dream-like multimedia presentation, which can be displayed on a mobile terminal, or other digital device, based at least in part on contextual information relating to the mobile terminal and the mobile terminal user. The presentation provides the user with a snapshot of information that appears to be more important to the user at a given period of time, as well as information that may have been forgotten by the user over time, and does so in a manner that is somehow reflective of the user's presumed mood.

18 Claims, 5 Drawing Sheets

DEVICE DREAM APPLICATION FOR A MOBILE TERMINAL

FIELD OF THE INVENTION

The present invention relates to digital devices and, more specifically, to an application for providing digital communication devices, such as mobile terminals and the like, with a dream-like presentation that provides a user with a quick snapshot of the more relevant past, present and future issues relating to the user.

BACKGROUND OF THE INVENTION

Mobile digital terminals, such as mobile telephones and the like, are becoming increasingly commonplace throughout the world. Recent technological advances in processing and storage capacity have made it possible for such terminals to become multi-functional. For example, no longer is the mobile telephone limited to telephonic voice communication but may also provide other means of digital communication, such as digital networking (e.g., Internet communication, text messaging, and the like), image or video capture means, digital video broadcast reception, and the like.

As the communication means and the functionality of such terminals expand, such terminals will readily come in contact with an increasingly voluminous amount of media items, such as email, voicemail, digital image files, digital video files, and the like. As the memory capacity of these terminals increases, either via internal memory capacity or the ability to readily access external memory storage elements, the user of the device will have the capability to store and/or access all of these media items.

The increasing amount of media items stored or available to the digital device has been the impetus behind implementation of file storage and organization applications, such as calendar-type or contact/address book-type applications, that allow the user to categorize media items according to the date and/or time associated with the media item. For example, the Microsoft Outlook application, available from the Microsoft Corporation of Redmond, Wash., provides for storage and categorization of email, voicemail and the like according to the date of receipt or the date of transmission of such data. Other applications have been developed that are more suitable to mobile terminals and enable the user to efficiently locate a media item according to the time associated with that media item. For example, if the media item is an image file captured by a mobile terminal (e.g., a photograph taken by a camera equipped mobile telephone) the calendar application will typically associate the image file with the date and time at which the image file was created or an event associated with the image file (e.g., a birthday party, a meeting, a family event, etc). Thus, the calendar-type applications allow the user to store media files, such as email, short message service (SMS) messages, voicemail, image files, video files and the like in a diary format to allow the user ready and efficient access to the media items.

Recent innovations have also made it possible for the mobile terminal to provide context-awareness functionality, such as location of the device, environment of the device's location, movement of the device, and the like. Such functionality is provided by including corresponding sensors in the device or enabling the terminal to communicate with external resources that provide context information. For example, the mobile terminal may be equipped with a Global Positioning Sensor (GPS) that provides the present location of the mobile device, a temperature sensor, an altitude sensor, motion or acceleration sensors and the like. External resources may be any external device capable of providing contextual information, such as access points, network nodes, other mobile communication devices, and the like.

Context-awareness is a key area of potential for mobile devices because it enables differentiation from stationary devices, like desktop computers, since mobile use is characterized by constant change in context (i.e., the device moves constantly and encounters constantly changing environments). Moreover, context-awareness enables an overall richer user-experience, and it provides the user with valuable information related to the context of the device.

In a typical context-awareness application the mobile terminal will be capable of providing current contextual information to the user. For example, an application may be implemented whereby the device is capable of providing the user, through a user interface, such as a display, with the current location of the device, the temperature, altitude, barometric pressure, or the like of the device's current location. Contextual information may also be captured, continuously or at a given time interval, and provided to certain types of applications that utilize the contextual information that is accumulated over time.

While numerous applications exist that enable a mobile terminal to store and/or access the increasingly voluminous amounts of media files and to provide current contextual information to the user, in order to access the stored data the user generally must go through several applications individually, scrolling through all of the data accessible by each application in order to find what they are looking for. For instance, the user may access his or her appointments via a calendar-type application, while accessing his or her email addresses or phone numbers via a contact/address book-type application. These applications do not provide the user with quick access to only the more relevant media files or contextual information in a single application or view. They do not allow the user to easily view the key pieces of information relating to the user all at one time.

A need, therefore, exists for a means by which a user can quickly and easily view information that is more relevant to the user at one point in time for various reasons.

BRIEF SUMMARY OF THE INVENTION

Embodiments of the present invention provide for a method, computer program product and device for creating a presentation of key data elements stored in or accessible by a mobile terminal based at least in part on what data elements relate to something or someone that is viewed as more important to the user of the mobile terminal, or "on the user's mind," at that point in time. In particular, one embodiment of the present invention provides a method for generating a "dream-like" multimedia presentation, the content and style of which is based at least in part on contextual information regarding the mobile terminal and the user of the mobile terminal. As discussed above, contextual information is information relating to, for example, where the mobile terminal, and, therefore, the user, is located (e.g., at home, at work, traveling), what the environment is like where the terminal is located (e.g., is it cold), how busy the user is (e.g., how many appointments are scheduled for that day), and who has contacted or been contacted by the user. Using this information, a multimedia presentation can be created that reflects an overall "mood" associated with the user and includes data relating to people or things that appear to be more important or relevant to the user at that moment in time. The presentation may also include randomly selected data elements that may serve to jog the user's memory about things that he or she may have forgotten, such as a friend that the user has not contacted in a long time, but whose contact information is stored in the user's mobile terminal. The presentation is, therefore, "dream-like" because, like many dreams, it includes not only information about things that appear to be on the user's mind, but also random bits of information that represent things that are in the user's subconscious.

In one exemplary embodiment of the invention a method of creating a presentation for a mobile terminal based at least in part on a plurality of context data elements accessible by the mobile terminal is provided. The method includes: (1) determining a relative importance of respective context data elements from among the plurality of context data elements; (2) selecting a combination of one or more data elements, wherein at least a portion of the combination is selected based on the relative importance of the respective context data elements; and (3) generating the presentation, wherein the presentation comprises the selected combination of one or more data elements.

According to one exemplary embodiment, a portion of the selected combination of one or more data elements is randomly selected, such that one portion of the presentation includes randomly selected data elements, while another portion includes data elements that were selected based on the relative importance of the respective context data elements. In another exemplary embodiment, the method of creating the presentation further includes determining the ratio of data elements in each of those portions with respect to the other.

In one exemplary embodiment, the method of creating the presentation further includes determining a mood associated with the user of the mobile terminal, and generating the presentation includes compiling the combination of one or more data elements with one or more media components in a manner that is reflective of that mood.

Aspects of the invention may also be embodied in a computer program product for creating a presentation for a mobile terminal based at least in part on a plurality of context data elements accessible by the mobile terminal. In one exemplary embodiment the computer program product comprises at least one computer-related storage medium having computer-readable program code portions stored therein. These computer-readable program code portions comprise: (1) a first executable portion for determining a relative importance of respective context data elements from among the plurality of context data elements; (2) a second executable portion for selecting a combination of one or more data elements, wherein at least a portion of the combination is selected based on the relative importance of the respective context data elements; and (3) a third executable portion for generating the presentation, wherein the presentation comprises the selected combination of one or more data elements.

Aspects of the invention may be defined by a mobile terminal device for providing a user with a presentation based at least in part on a plurality of context data elements accessible by the mobile terminal device. In one exemplary embodiment, the mobile terminal device comprises a display, a processor in communication with the display, and a memory module in communication with the processor. The memory module stores a plurality of data elements, including the plurality of context data elements, and a presentation application executable by the processor. In one embodiment, the application determines a relative importance of respective context data elements from among the plurality, selects a combination of one or more data elements based at least in part on the relative importance of respective context data elements, and generates a presentation comprising the combination. The presentation can then be displayed to the user on the display.

In one exemplary embodiment, the mobile terminal device further comprises one or more sensors in communication with the processor for sensing one or more context data elements. In another exemplary embodiment, the memory module further comprises one or more context data element-generating applications that generate one or more context data elements. In yet another exemplary embodiment, the mobile terminal device further comprises a wireless communication module in communication with the processor that provides for wireless communication with external elements that provide one or more context data elements.

In another exemplary embodiment, the mobile terminal device comprises: (1) a first means for determining a relative importance of respective context data elements from among the plurality of context data elements accessible to the mobile terminal device; (2) a second means for selecting a combination of one or more data elements from among the plurality based at least in part on the relative importance of respective context data elements; and (3) a third means for generating a presentation comprising the combination of one or more data elements selected.

BRIEF DESCRIPTION OF THE DRAWINGS

Figure 1:
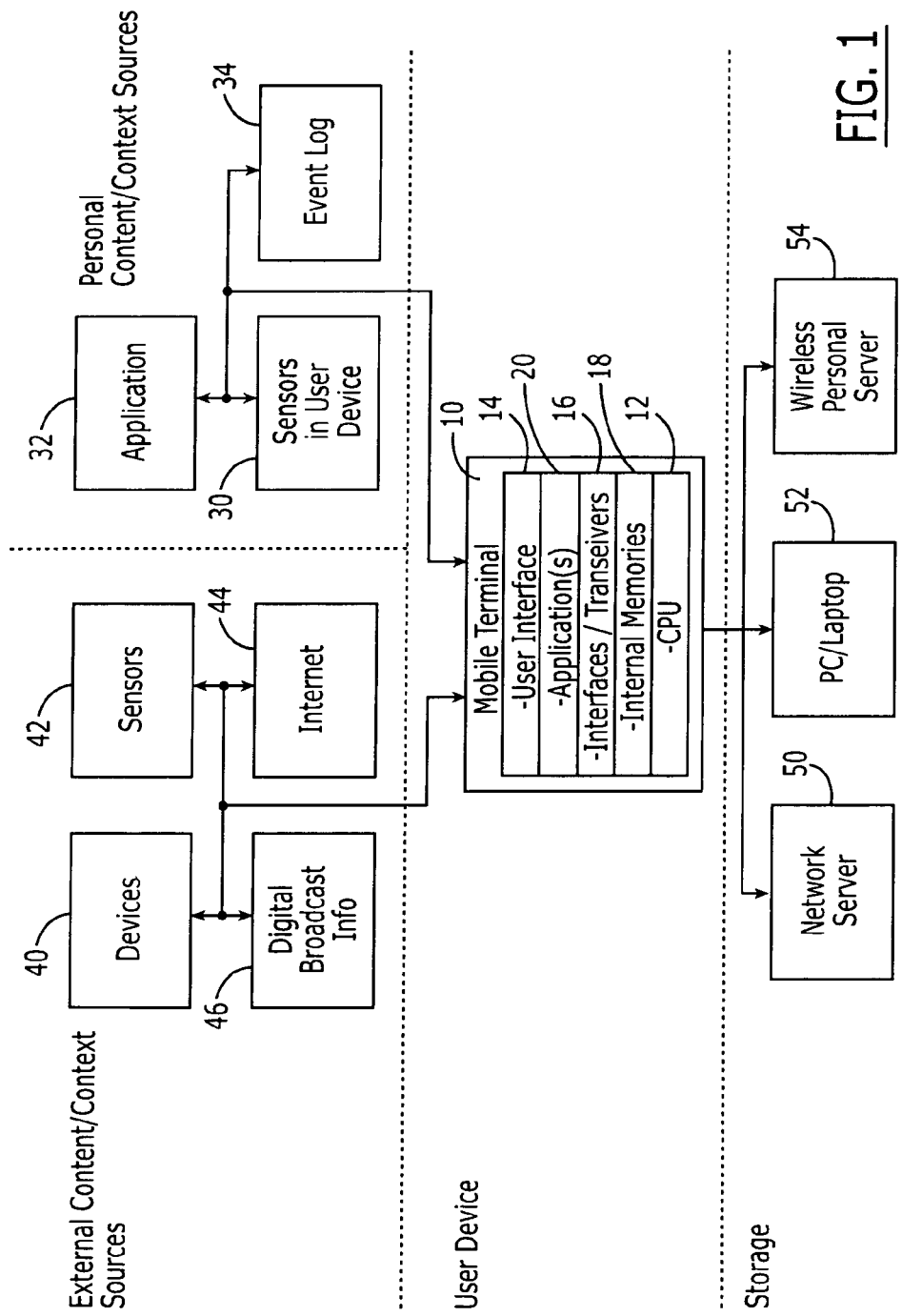
Figure 2:
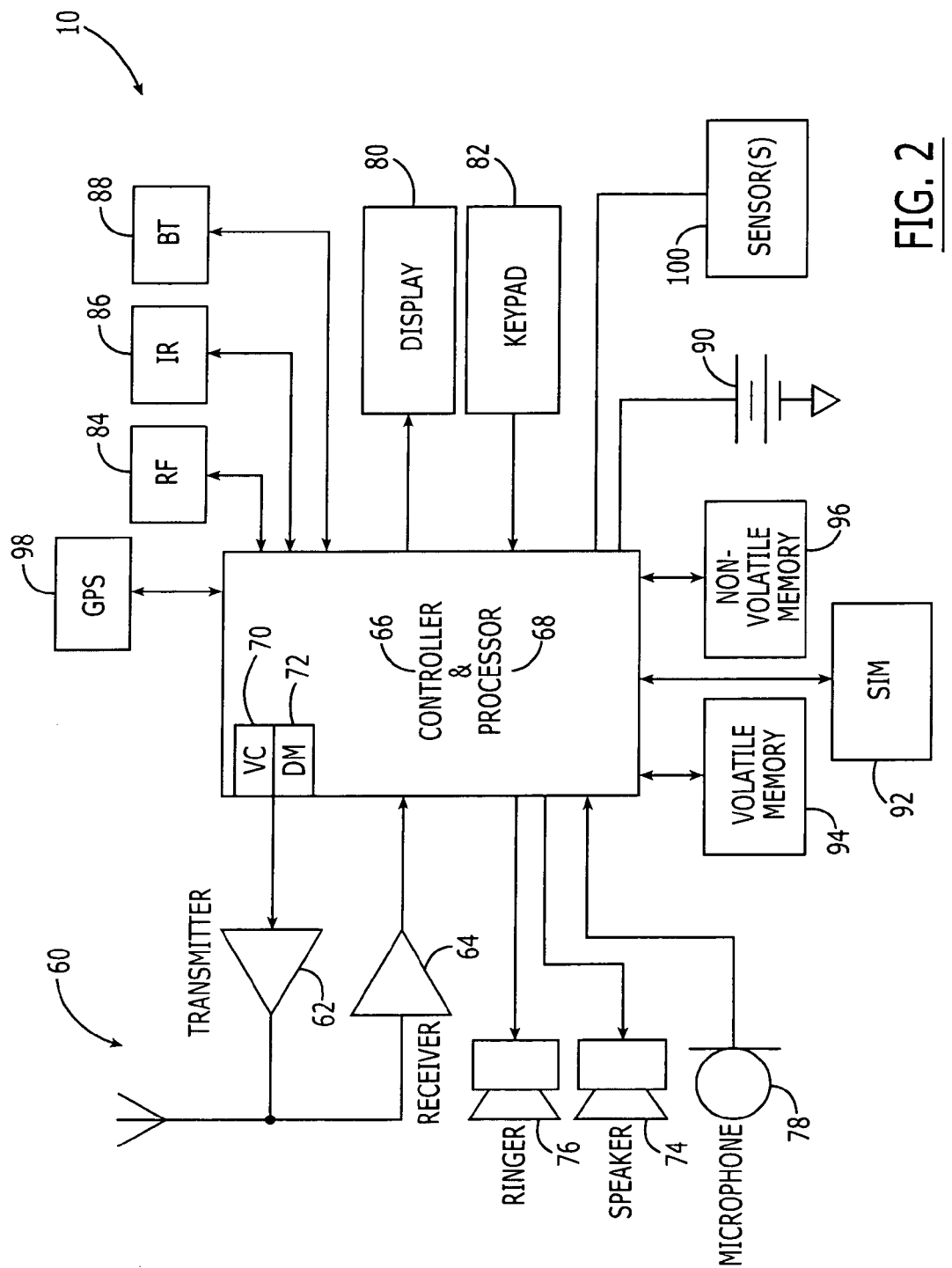
Figure 3:
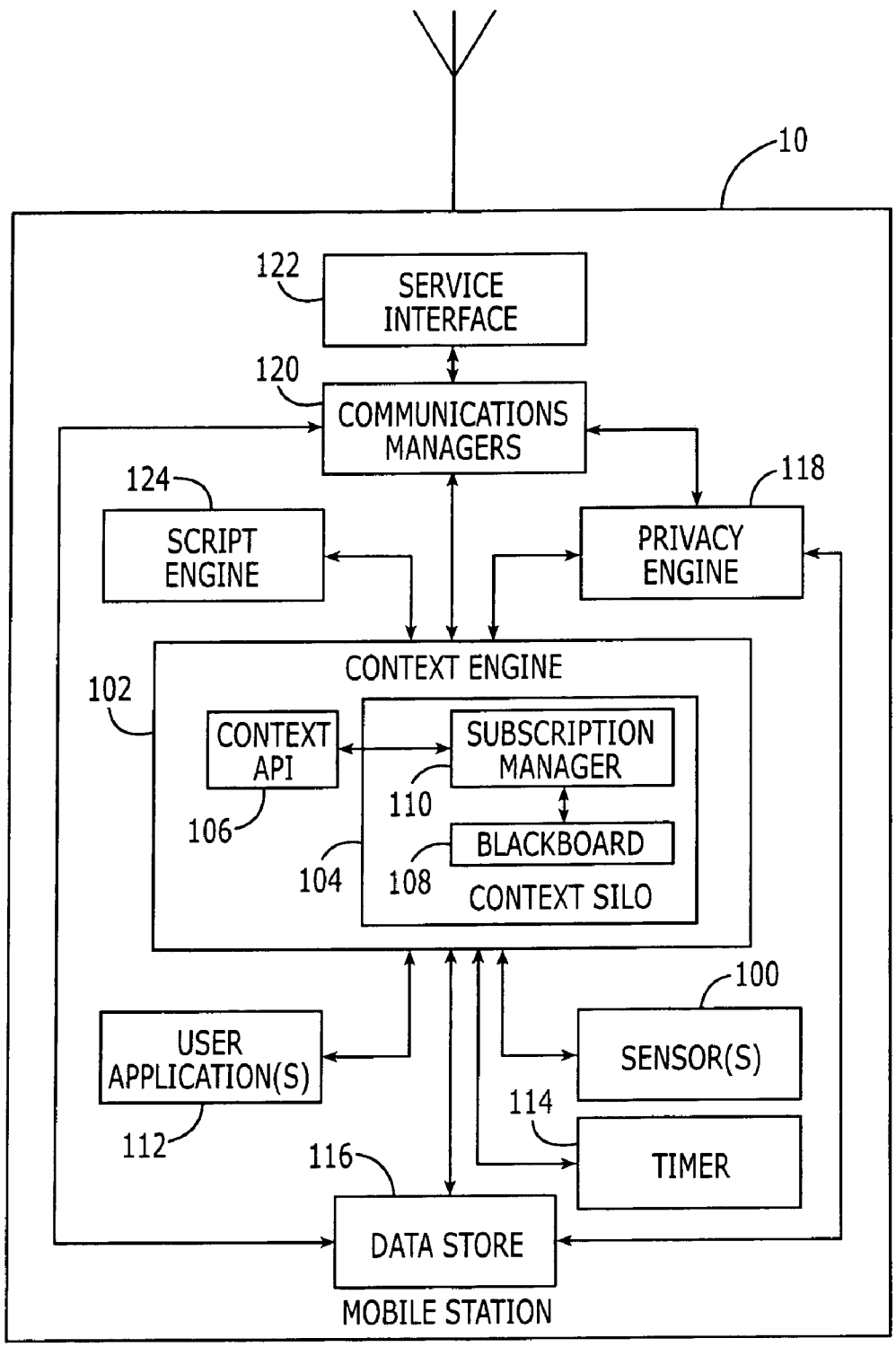
Figure 4:
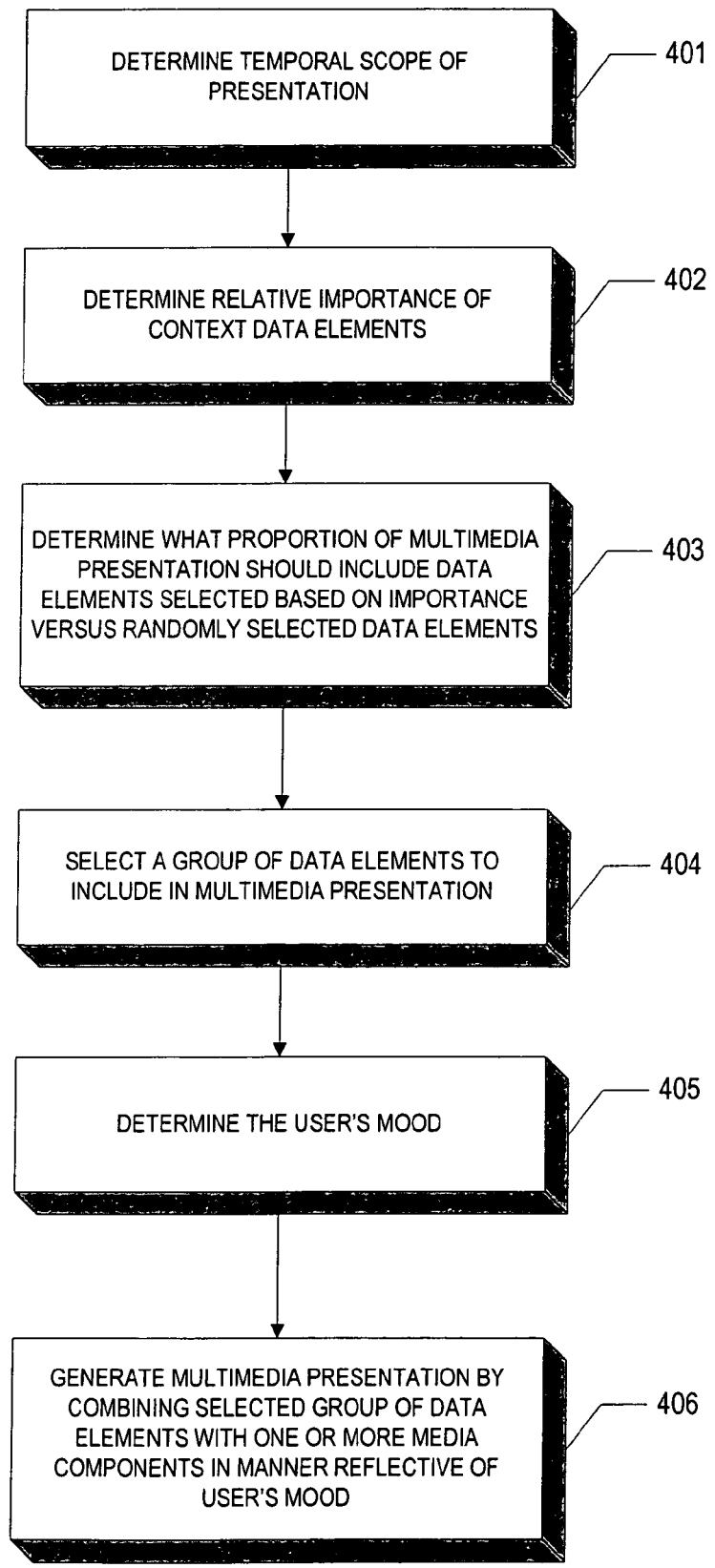
Figure 5:
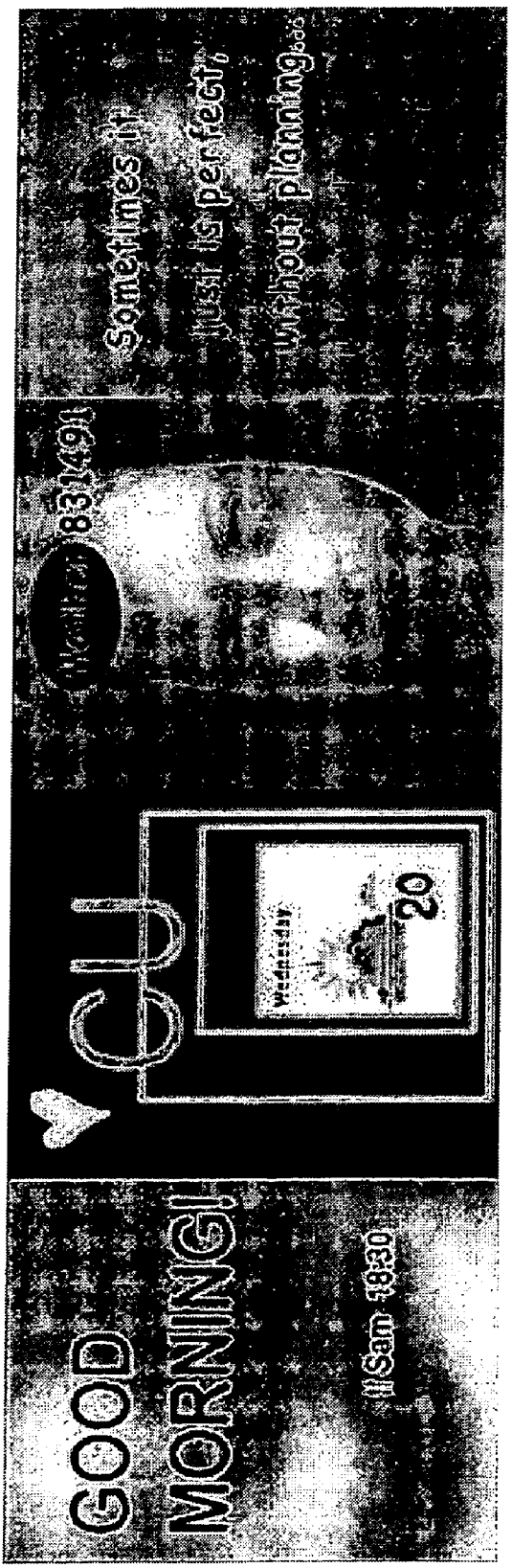

Having thus described the invention in general terms, reference will now be made to the accompanying drawings, which are not necessarily drawn to scale, and wherein:

FIG. 1 is a block diagram of the overall system for context information distribution and storage, in accordance with an exemplary embodiment of the present invention;

FIG. 2 is a block diagram of a mobile terminal implementing a Device Dream application in accordance with an exemplary embodiment of the present invention;

FIG. 3 is a block diagram of a mobile terminal implementing a context engine for capture and processing of context data, in accordance with an exemplary embodiment of the present invention;

FIG. 4 is a flow chart illustrating the steps of creating a dream-like multimedia presentation in accordance with an exemplary embodiment of the present invention; and FIG. 5 illustrates four screenshots or views from a dream-like multimedia presentation created in accordance with an exemplary embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As will be appreciated by one skilled in the art, the present invention may be embodied as a method, a mobile terminal device or other apparatus, or a computer program product. Accordingly, the present invention may take the form of an entirely hardware embodiment, an entirely software embodiment, or an embodiment combining software and hardware aspects. Furthermore, the present invention may take the form of a computer program product on a computer-readable storage medium having computer-readable program instructions (e.g., computer software) embodied in the storage medium. More particularly, the present invention may take the form of web-implemented computer software. Any suitable computer-readable storage medium may be utilized including hard disks, CD-ROMs, optical storage devices, or magnetic storage devices.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks, although other means for implementing the functions including various combinations of hardware, firmware and software as described herein may also be employed.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Overview

Exemplary embodiments of the present invention provide a method for creating a presentation, which can be viewed on a mobile terminal or other digital device, such as a personal digital assistant (PDA), mobile communication device, personal computer, laptop computer, or the like, that is similar to, or represents, the mobile terminal user's dream. The presentation can be characterized as dream-like because it not only provides snapshots of things that appear to be on the user's mind at the moment, but, in one embodiment, also randomly selected pieces of information that represent things that are buried in the user's subconscious. The presentation can also be referred to as dream-like because, like a dream, the tone of the presentation presented by one embodiment varies as the "mood" of the user varies. For example, if the user appears to be stressed (e.g., based on the multitude of appointments scheduled for the user in the upcoming days or weeks), the presentation may be more like a nightmare, with the elements of the presentation being displayed rapidly to loud music playing frantically in the background.

According to exemplary embodiments of the present invention, contextual information regarding the mobile terminal, and the user of the mobile terminal, are gathered and used to determine what mood the user is in and what things are on the user's mind. This contextual information may include, for example, information regarding terminal movement, terminal location, detected devices in the proximate area of the terminal, detected persons in the proximate area of the terminal, files created or received by the terminal (e.g., emails, short message service (SMS) messages, voicemail, image files, video files, etc.), calendar entries, temperature and/or other environment parameters (e.g., barometric pressure, altitude, etc.), health related parameters (e.g., blood pressure, blood sugar, heart beat, etc.), and the like.

Using the gathered contextual information, a relevant importance can be assigned to each of the respective context data elements—i.e., a determination can be made of what is on the user's mind. Relevant importance may be determined, for example, by the frequency with which a certain context data element is referenced, or by the level of significance or importance assigned to the context data element by the user. For example, where a user calls or emails a certain person with greater frequency on a certain day, or over a span of several days, that person would be assumed to be relatively important to the user at that moment (i.e., the emails, voicemails, or SMS messages associated with that person are considered relatively important with respect to emails, voicemails, or SMS messages associated with other people contacted less frequently). Similarly, where the user has designated that a certain appointment has a high priority, or has sent an email marked "URGENT" or of "HIGH IMPORTANCE," that appointment or that email are also assumed to be relatively important.

Based on the relative importance of the various context data elements, the content of the presentation is selected. For example, where, as discussed above, a certain person is determined to be relatively important based on the frequency with which the user contacted or was contacted by that person, data elements associated with that person (e.g., pictures of that person, messages to or from that person, or that person's email address or phone number) would be included in the presentation. Where many things appear to be on the user's mind, the content of the presentation may tend to include a greater percentage of data elements which have been specifically selected based on the relative importance of various context data elements, with a smaller percentage of data elements representing things in the user's subconscious—i.e., randomly selected data elements. In contrast, where the user appears to have a relatively clear mind—i.e., few context data elements have a higher importance than other context data elements—the majority of the presentation may include randomly selected data elements representing the user's subconscious.

The contextual information can also be used in exemplary embodiments of the present invention to determine what mood the user is in and, therefore, to dictate the tone of the presentation. For example, where the user's blood pressure is high, he or she has an extremely busy day coming up based on the calendar entries, and/or the user is staying in a hotel on a business trip, it may be determined that the user is stressed or unhappy. In this case the tone of the presentation (or dream) may be that of a nightmare by having loud, fast music, dark and gloomy pictures, and/or symbols of lightning rods or skulls and crossbones. Alternatively, where the user is on vacation (as can be determined, for example, based on the location of the terminal and/or calendar entries), the user's mood may be determined to be relaxed or happy causing the presentation to be more like a pleasant dream in that the music is slow and soothing, the pictures are bright and of beautiful sceneries, and/or the symbols are of hearts or flowers.

In addition to including data elements specifically related to the user, like email addresses stored in the user's address book, calendar entries, or pictures taken by the user, in various exemplary embodiments the presentation will also include various media components, such as symbols, downloaded photos, various text messages, or music files, that are either stored in the mobile terminal or accessible by the mobile terminal. As in the above instances, the contextual information may dictate which of these media components are included in the presentation. For example, where the temperature of the terminal location is cold, the presentation may include a picture of a snowy mountain top, or, where it is hot, the picture may be of a warm beach in Hawaii. As stated above, the background music selected for the presentation may vary from fast-paced heavy medal or techno music, where the presentation is along the lines of a nightmare, to slow, soothing instrumental music where the user is determined to be calm or relaxed.

In general, exemplary embodiments of the present invention provide a method, computer program product and device for providing a user with a dream-like multimedia presentation that may be reflective of the user's mood, what is on the user's mind, and what is buried in the user's subconscious.

Acquiring, Storing and Accessing Context Related Data

FIG. 1 provides a general overview of a system for capturing context information, in accordance with an embodiment of the present invention. The digital device 10, typically a mobile digital communication device includes various means for performing one or more functions in accordance with exemplary embodiments of the present invention, including those particularly shown and described herein. It should be understood, however, that one or more entities may include alternative means for performing one or more like functions, without departing from the spirit and scope of the present invention. More particularly, for example, as shown in FIG. 1, the mobile digital communication device will typically include a central processing unit 12, user interfaces 14, such as a keypad, display and the like, wireless communication interfaces 16, such as transceivers and the like, and memory elements 18 that store various device related applications 20, including the Device Dream application of the present invention alone or incorporated with other context data related applications.

The digital device 10 will either rely on personal sources, such as personal sensors and personal applications, for context and/or content information, and/or the device may rely on external sources that communicate with the device via a network. Personal sensors are typically internal to the digital device that is generating the dream-like multimedia presentation. However, in certain embodiments of the invention, the personal sensors may be separate from the digital device and in communication with the digital device through an acceptable communication interface. If the device relies on personal sources for contextual information, these sources may include, but are not limited to, personal sensors 30, personal applications 32, personal databases 34 and the like. The sensors 30 may take the form of Global Positioning Sensors (GPS), temperature sensors, altitude sensors, barometric pressure sensors, motion sensors, acceleration sensors, electronic compass, medical sensors, such as blood pressure sensors, blood sugar sensors, heart beat sensors and the like. One or more of the personal sensors 30 may be incorporated in a personal wrist watch or in a personal health or medical monitoring device that communicates with the terminal, such as via a Bluetooth or other wireless or wired connection, as described below. The personal applications 32 may include a calendar application, a media diary application, or the like, and the personal databases 34 may include a media storage application, an event log, a file manager, or the like.

If the device relies on external sources for contextual information the device will typically monitor the device's environment for any context and or content information from external sources. Monitoring the environment may involve one or several wired or wireless communication means, including, but not limited to, Bluetooth® (communication in the about 2.45 GHz frequency range), Ultra WideBand (UWB) communication, Wireless Local-Area Network (WLAN), Radio frequency Identification (RFID), wireless telecommunication, Internet, Digital Video Broadcast (DVB), Digital Multimedia Broadcast (DMB), Amplitude Modulation (AM), Radio Data System (RDS), IrDa, Digital Audio Broadcasting (DAB) and the like. The context and/or content information may be registered or updated when detected or received, or it may be registered or updated based on predefined time intervals, such as every second, minute or hour.

The external sources include any external electronic devices that have the appropriate communication interface to communicate with the digital device. The external sources may include, but are not limited to, devices 40, sensors 42, Internet resources 44, digital broadcast information 46 and the like. The devices 40 may include printers, display devices, access points, network nodes, industrial control devices, domestic appliances, consumer electronic devices, computers, mobile communication devices, wrist watches, etc. The devices 40 may include one or more sensors and/or applications. The sensors 42 may include Global Positioning Sensors (GPS), temperature sensors, altitude sensors, barometric pressure sensors, motion sensors, acceleration sensors, and the like. The Internet resources 44 may be any content available through the Internet, and the digital broadcast information 46 may be any information transmitted via a wireless or wireline broadcast network. For example, the digital broadcast information may include an electronic program guide (EPG), an electronic service guide (ESG), or the like. In addition to the external sources shown in FIG. 1, the sources may be any received content, such as television or radio broadcast, video or audio files, games, content delivery via the Internet, wireless telecommunication network content, or the like.

Context data received from external sources may also include access information, user interface information and/or settings information. For example, a printer device may provide its access information, a room temperature control unit may provide its setting information and instructions on changing the settings. The digital device may store this data and the Device Dream application will access this information when the device comes in contact with external source.

In addition to the digital device and the external sources, the system may additionally include storage means in the form of external mass storage units that store either a portion of or the entirety of the digital device's context information, content information and/or calendar information. Examples of such storage units include, but are not limited to, network servers 50, personal computers (PCs) 52 or laptop computers, or portable and/or wireless personal server devices 54, such as a portable music/video/multimedia player that are accessible via a wireless or wireline communication network. In addition to storing context information, the storage means may also store the Device Dream application of embodiment of the present invention and communicate the user interface aspects of the application to the digital device. Storage of the Device Dream application at the storage means is typically implemented in instances in which the digital device has limited memory capacity or processing capabilities.

Reference is now made to FIG. 2, which illustrates one type of digital device 10, a mobile terminal that would benefit from embodiments of the present invention. It should be understood, however, that the mobile terminal illustrated and hereinafter described is merely illustrative of one type of terminal that would benefit from the present invention and, therefore, should not be taken to limit the scope of the present invention. While several exemplary embodiments of the terminal are illustrated and will be hereinafter described for purposes of example, other types of terminals, such as portable digital assistants (PDAs), pagers, laptop computers, mobile telephones, mobile communication devices, wrist watches, digital cameras, digital camcorders, digital audio devices, digital video devices, wireless personal server devices and other types of devices or any combination of the mentioned electronic systems or devices, can readily employ the present invention.

As stated above, the mobile terminal (or mobile digital communication device) includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 2, in addition to an antenna 60, the mobile terminal includes a transmitter 62, a receiver 64, a controller 66, and a processor 68 that provides signals to and receives signals from the transmitter and receiver, respectively. These signals include signaling information in accordance with the air interface standard of the applicable cellular system, and also user speech and/or user generated data. In this regard, the mobile terminal can be capable of operating with one or more air interface standards, communication protocols, modulation types, and access types. In some embodiments of the mobile terminal of the present invention, the processor 68 includes the controller 66.

It is understood that the controller 66 includes the circuitry required for implementing the audio and logic functions of the mobile terminal. For example, the controller may be comprised of a digital signal processor device, a microprocessor device, and various analog-to-digital converters, digital-to-analog converters, and other support circuits. The control and signal processing functions of the mobile terminal are allocated between these devices according to their respective capabilities. The controller can additionally include an internal voice coder (VC) 70, and may include an internal data modem (DM) 72. Further, the controller may include the functionally to operate one or more software programs, which may be stored in memory (described below). For example, the controller may be capable of operating a connectivity program, such as a conventional Web browser. The connectivity program may then allow the mobile terminal to transmit and receive Web content, such as according to the Hypertext Transfer Protocol (HTTP) and/or the Wireless Application Protocol (WAP), for example.

The mobile terminal also comprises a user interface including a conventional earphone or speaker 74, a ringer 76, a microphone 78, a display 80, and a user input interface, all of which are coupled to the controller 66. The user input interface, which allows the mobile terminal to receive data, can comprise any of a number of devices allowing the mobile terminal to receive data, such as a keypad 82, a touch display (not shown) or other input device. In embodiments including a keypad, the keypad includes the conventional numeric (0-9) and related keys (#, *), and other keys used for operating the mobile terminal.

As shown in FIG. 2, the mobile terminal can include a radio frequency (RF) transceiver 84 (which includes a RFID reader) so that data can be shared with and/or obtained from electronic devices including other radio frequency transceivers or transponder tags. In some embodiments of the mobile terminal of the present invention, the RFID reader also includes the processor 68 and/or the controller 66. The mobile terminal can additionally, or alternatively, include other short-range communication transceivers, such as, for example, an infrared (IR) transceiver 86, and/or a Bluetooth® (BT) transceiver 88 (operating in the 2.45 GHz frequency band) operating using Bluetooth brand wireless technology developed by the Bluetooth Special Interest Group. The RF transceiver 84 and/or other transceivers may be associated with the mobile terminal in any manner known to those skilled in the art. For example, in some embodiments, the RF transceiver 84 and/or other transceivers may be integrated in the mobile terminal or may be separate from, but in communication with, the mobile terminal, such as via any type of wireline and/or wireless techniques. The mobile terminal can therefore additionally or alternatively be capable of transmitting data to and/or receiving data from electronic devices and/or tags. Although not shown, the mobile terminal may additionally or alternatively be capable of transmitting and/or receiving data from electronic devices and/or tags according to a number of different wireless networking techniques, including, but not limited to, for example, WLAN techniques such as IEEE 802.11 techniques, wireless telecommunication techniques such as GSM, UTMS or 3G or the like.

The mobile terminal also includes a battery 90, such as a vibrating battery pack, for powering the various circuits that are required to operate the mobile terminal, as well as optionally providing mechanical vibration as a detectable output. For example, the battery 90 may provide at least a portion of the power required to operate the RFID reader.

The mobile terminal can further include memory, such as a subscriber identity module (SIM) 92, a removable user identity module (R-UIM) or the like, which typically stores information elements related to a mobile subscriber. In addition to the SIM, the mobile terminal can include other removable and/or fixed memory. In this regard, the mobile terminal can include volatile memory 94, such as volatile Random Access Memory (RAM) including a cache area for the temporary storage of data. The mobile terminal can also include other non-volatile memory 96, which can be embedded and/or may be removable. The non-volatile memory can additionally or alternatively comprise an EEPROM, flash memory or the like. The memories can store any of a number of pieces of information, and data, used by the mobile terminal to implement the functions of the mobile terminal. The memories can also store one or more applications capable of operating on the mobile terminal.

As a means of capturing context information, the mobile terminal may include a positioning sensor, such as a global positioning system (GPS) sensor 98. In this regard, the GPS sensor is capable of determining a location of the mobile terminal, such as the longitudinal and latitudinal position of the mobile terminal. The mobile terminal may also include one or more additional sensors 100 for sensing the ambient conditions of the mobile user and, more particularly, the mobile terminal operated by, or otherwise under the control of, the mobile user. In this regard, the mobile terminal may include sensors such as, for example, a positioning sensor, a touch sensor, an audio sensor, a compass sensor, an ambient light sensor, an ambient temperature sensor, an ambient pressure sensor, a proximity sensor, and/or an acceleration sensor.

The audio sensor can include the microphone 78, for example, which can detect speech or environmental sounds. The positioning sensor can include, for example, the GPS sensor 98. Additionally, or alternatively, the positioning sensor can include, for example, a radio beacon triangulation sensor that determines the location of the mobile terminal by means of a network of radio beacons, base stations, or access points, as is described for example, in Nokia European patent EP 0 767 594 A3, entitled "Mobile Station Positioning System" published on May 12, 1999, the contents of which are hereby incorporated by reference in its entirety. As will be appreciated, the sensors can also be located in accessory-like mobile terminal covers and/or in a wireless accessory such as a Bluetooth®-enabled device. The sensors may further be located in the environment such as in the user's rooms or vehicles. Also, information capable of being measured by the mobile terminal, such as the time duration of use of the mobile terminal, can be received as sensor data by the mobile terminal. For more information on such sensors, see U.S. patent application Ser. No. 09/854,628, entitled "Context Sensitive Web Services" filed May 15, 2001 and published Nov. 21, 2002 as U.S. Patent Application Publication No. 2002/0173295, the contents of which are hereby incorporated by reference in its entirety.

The measured and/or sensed data may then be utilized, such as by the processor 66, to determine a context and/or change in context of the mobile terminal. Although the context and/or a change in context may be determined in various manners, the measured and/or sensed data may be transmitted according to one exemplary embodiment to a central blackboard that delegates the determined changes in the context to different destinations, such as the RFID transceiver 84, which includes a RFID reader, utilizing a context exchange architecture.

FIG. 3 illustrates a context exchange architecture of a mobile terminal 10 to determine a context and/or change in context of the mobile terminal in accordance with one embodiment of the present invention. As shown in FIG. 3, the context exchange architecture of the mobile terminal 10 according to one embodiment of the present invention includes one or more sensors 100 that are capable of providing measured and/or sensed data, as described above. The sensors are further capable of preprocessing the measured and/or sensed data into "context atoms," such as by a sensor application program interface (API), and thereafter stored. As used herein, a "context atom" generally refers to a specific piece of context-related information. A context atom can comprise an entity that typically has an associated name, value, source (i.e., originator), date and/or any of a number of other attributes. More particularly, the context atom can include other attributes including metadata information, such as the reliability of the context-related information, as well as its accuracy, source, time of creation, etc. For example, a temperature sensor can measure the ambient temperature of the environment around the mobile terminal 10, and thereafter process the temperature into a context atom. Also, for example, the mobile terminal may store a directory that can measure, or record, the last call made or received in the mobile terminal. The last call data can then be processed into a context atom. Further, the terminal may store metadata information on actions and manipulations, such as editing, sending, renaming displaying, etc., performed on a data file. This information can then be processed into a context atom. Further, for example, a three-axis acceleration sensor can measure movement of the mobile terminal. Thereafter, the movement data can be processed into a context atom that may include the current absolute value of acceleration, the value integrated over several seconds, and/or a rough estimate whether the mobile terminal, or more particularly the mobile terminal user, is walking, running, standing still or perhaps sitting in a car.

The context exchange architecture of the mobile terminal 10 also includes a context engine 102, which is capable of receiving, and thereafter storing, the context atoms, as well as providing access to the context atoms in accordance with embodiments of the present invention. The context engine includes a context silo 104 and a context API 106. The context silo can, in turn, include a blackboard 108 and a subscription manager 110. The blackboard is a storage unit for context-related information and, as such, typically stores the context atoms received from the sensors or other context sources (such as other electronic devices, applications, applications residing behind a network, other user terminals, etc.). Additionally, the blackboard can provide an API to query and set context atoms. The subscription manager, in turn, can provide subscriptions to various of the context atoms and/or notifications when such context atoms change. The subscription manager can therefore periodically poll the context atoms based upon such subscriptions and notifications. To provide access to the context silo, the context engine further includes the context API. In this regard, the context API allows one or more user applications 112 and/or one or more timers 114 to access the context data from the blackboard, in accordance with embodiments of the present invention. The timer 114 generally tracks the time between determinations of a change in context of the mobile terminal 10. In other embodiments of the mobile terminal 10, the timer 114 may be included in the user application(s) 112 and/or the context engine 102.

The blackboard 108 is capable of storing context atoms for an indefinite period of time, unless otherwise instructed. For example, one or more context atoms can include an expiration time such that after the respective context atoms expire, such context atoms can be deleted from the blackboard, with a notification transmitted to devices subscribing (described below) to the respective context atom, if so desired. As will be appreciated, however, each time a context atom is updated with different information (e.g., different values), the expiration time can be reset. Also, in such instances as when a new context atom is stored in the blackboard that has the same name and context source (indicating that it appeared from the same source) as a previous context atom already in the blackboard, the new context atom can replace the previous context atom, which can then be either discarded or moved to a history buffer, for example.

The context exchange architecture further includes a data store 116 coupled to the context engine 102. The data store is capable of storing information such as, for example, user preferences, profile information, as well as permissions for a privacy engine 118, also included within the architecture. The privacy engine is capable of providing security and privacy. More particularly, the privacy engine is capable of functioning on any of a number of different levels of security and privacy, from the lowest point of communication (e.g., a firewall) to the highest level (e.g., "who is my friend and who is not"). The user preferences and profiles in the data store, then, can control operation of the privacy engine. For example, the privacy engine can retrieve, from the data store, a list of known friends such that, when the mobile terminal 10 is queried for an action to be performed in accordance with embodiments of the present invention, the privacy engine can indicate whether the action is allowed by comparing the querying entity to the list of friends. In one advantageous embodiment, the privacy engine functions based on devices and/or user applications operating on context atoms in accordance with embodiments of the present invention, as well as a type of action, e.g., put, get, subscribe, notify, etc., as described below. It should be understood, however, that the privacy engine can also utilize other information, including other context atoms and data in the data store to make decisions as to permissions.

In addition to the sources of context-related information within the mobile terminal 10 (e.g., sensors 100 and other data measuring elements), the context exchange architecture can provide for receiving context-related information from sources outside the mobile terminal. In this regard, the context exchange architecture includes a communications manager 120, which can identify other context sources located within a communication distance from the mobile terminal. In addition to identifying the other context sources, the communications manager can initiate contact with such context sources and, in general, provide housekeeping for communications with such context sources. The communications manager can also function as a firewall (along with the privacy engine 118). Advantageously, the communications manager can abstract different connection types to the context engine 102 such that context atoms within the context engine can be stored and/or retrieved regardless of whether the communications manager communicates with other context sources via Bluetooth, GPRS, RFID, USB, or some other link type.

To facilitate the mobile terminal 10 communicating with the cellular network, data network and/or other electronic devices, the context exchange architecture also includes a service interface 122. The service interface operates in much the same manner as the context API 106 in the context engine 102. In this regard, the service interface can comprise, for example, an over-the-air interface, as well as the underlying transport protocols (e.g., Ethernet, GPRS, TCP/IP). In accordance with various exemplary embodiments of the present invention, the context exchange architecture also provides a context exchange protocol. Generally, the context exchange protocol comprises a standardized protocol that allows different entities to exchange context atoms in a secure and reliable fashion, regardless of underlying architecture or transmission channel. In this manner, for example, at least a portion of the context atoms stored in the blackboard 108 can be stored in a separate memory device, such as a memory device coupled to an origin server.

The context exchange architecture can additionally provide for creating new context atoms, as well as deleting and/or modifying existing context atoms. In this regard, the context exchange architecture can include a script engine 124, which can store rules and conditions. In one exemplary, advantageous embodiment, the script engine is capable of receiving external rules according to the context exchange protocol, and thereafter storing the rules. The script engine can then examine the rules, subscribe to the relevant context atoms (described below), and then execute the rules according to conditions defined in the rules. The script engine allows complex rules to be executed for different events. As such, the script engine can reduce the need for application code, as well as reduce bandwidth requirements. Further, whereas the subscription manager typically only transmits notifications when a context atom changes, the script engine can further specify requirements of the conditions to transmit a notification. For example, the script engine can specify conditions such as "transmit a notification only when the value changes by more than 20%." In one embodiment, for example, the rules can comprise one or more Java classes that include executable code defining the conditions of the rules, and/or extensible markup language (XML) scripts that include Boolean logic defining the conditions of the rules.

Each context rule typically includes one or more conditions and one or more actions to be performed when the conditions are satisfied. In this regard, the conditions of the context rules are typically related to the context atoms, or more particularly, the values in the context atoms. The script engine 124 can execute any of a number of different context rules that include any of a number of different actions. For example, the context rules can specify the setting of a value of a context atom, the transmission of a notification, and/or the transmission of a context atom to another device and/or application. Context rules can be exchanged between the mobile terminal 10 and other devices, such as electronic devices, in a number of different manners. In one embodiment, for example, context rules can be exchanged in accordance with the context exchange protocol, such as to add a new context rule, remove a context rule and/or notify a device of an expired or otherwise disabled context rule. Alternatively, context rules can be created internally within the mobile terminal.

The elements of the architecture have been described independent of the mobile terminal diagram of FIG. 2. It should be understood, however, that the architecture of embodiments of the present invention, such as are illustrated in FIG. 3, are capable of being performed by a mobile terminal that includes the elements illustrated in FIG. 2. In this regard, at least a portion of the elements of the architecture are capable of being embodied in corresponding elements illustrated in FIG. 2. For example, the blackboard 108 and/or data store 116 are capable of being embodied in memory such as SIM 96, volatile memory 98 and/or non-volatile memory 100. Also, the functions of the context engine 102, script engine 124 and/or communications manager 120 are capable of being performed by controller 64 and/or processor 66. Additionally, or alternatively, one or more of the elements of the architecture of embodiments of the present invention can be performed by, and/or mirrored by, other elements of the cellular network and/or the data network of FIG. 1. For example, a copy of the contents of the blackboard in the mobile terminal can be maintained in an operator's server (e.g., origin server).

As indicated above, context atoms typically include at least a name and a value, and may also include metadata information such as, for example, its reliability, accuracy, source, time of creation, etc. In operation, the context atoms are typically created by entities called "context producers." A context producer can comprise any of a number of different internal or external systems, devices and/or elements capable of creating a context atom, but in one typical embodiment, a context producer can comprise an internal sensor 94 and/or user application 112, and/or an external system, device and/or element (e.g., sensor or user application) capable of pushing a context atom to the mobile terminal, such as in accordance with the context exchange protocol. Upon creation and/or receipt by the mobile terminal, the context atoms can be stored in the blackboard 108. For example, a thermometer can measure the ambient temperature of the environment and process the temperature measurement into the context atom "environment.temperature=95° C.," which can then be stored by the blackboard 108. Additionally, or alternatively, a temperature change over a period of time can be determined, such as by a user application 112, and stored by the blackboard. As another example, a sensor (input device) can retrieve a signal from local beacons that identify the location of the mobile terminal and process the signal into the context atom "location.logical=sauna," which can thereafter be stored by the blackboard.

The mobile terminal 10 can receive measurements from any of a number of different types of local beacons capable of transmitting information such as, for example, a Bluetooth device and/or a RFID tag. In this regard, when the local beacon comprises a RFID tag, a RFID transceiver 82 within the mobile terminal can receive the signal from the beacon by performing a service discovery to determine the RFID tag identifiers in the vicinity of the mobile terminal. The identifiers can then be stored by the blackboard as the context atoms "local RFID tag environment." Another application, referred to as a context consumer and described below, can then subscribe to the "local RFID tag environment," to thereby receive periodic updates of the measurements received by the RFID transceiver 82. In this regard, the mobile terminal can monitor the area proximate the mobile terminal for electronic devices, and request location information from them, if available. The mobile terminal can then store any available location information back on the blackboard 108, where other applications (context consumers) can get the information. In the example given above, a RFID beacon can announce its location to be a sauna, so that mobile terminal stores the context atom "location.logical=sauna" in the blackboard.

The preceding example illustrated the mobile terminal 10 storing a context atom identifying a logical location (i.e., sauna). It should be understood, however, context atoms can be created to identify any of a number of other types of locations, such as an exact location (e.g., GPS coordinates and/or addresses) and/or a relative location (e.g., "next to K-Mart"). The use of the GPS sensor 92 can be advantageous for providing location information, particularly when the mobile terminal is located outdoors. Even the absence of GPS location information can be useful, however, such as indicating a probability that the mobile terminal is located indoors, where the GPS sensor may not be able to detect location information.

Once stored within the blackboard 108, context atoms are typically retrieved by entities referred to as "context consumers." Like the context producer, a context consumer can comprise any of a number of different internal or external systems, devices and/or elements capable of retrieving a context atom. In this regard, when a context consumer desires to retrieve a context atom, the context consumer connects to the mobile terminal 10, such as according to the context exchange protocol when the context consumer is external to the mobile terminal or according to the context API 106 when the context consumer is internal to the mobile terminal. The context consumer can thereafter transmit a request to the context engine 102 identifying the context atom by name. For example, a request may read "Please give me a context atom called "environment.temperature," where the phrase "environment.temperature" represents the ambient temperature of the environment around the mobile terminal. Additionally, or alternatively, a context consumer can transmit a request identifying a context atom by the source of the respective context-related information, and/or a combination of the source and the context atom name, thereby permitting a context consumer to limit its queries to a specific context source. For example, a context consumer can transmit the request "Please give me all the context atoms provided by the temperature sensor in the mobile terminal." In one typical instance, an application may desire to act as a preprocessor to a singular sensor such that the application does not want to receive context atoms associated with other sensors providing the same context-related information. This, of course, means that the name of a context atom may not be unique, but that a context atom may be characterized by one or more other attributes, including the source of a context atom.

In response to the request, the context engine 102 can then query the privacy engine 118 as to whether the context consumer is allowed to retrieve the requested information. If the context consumer has permission to retrieve the requested context atom, the context atom is transmitted to the context consumer. In this regard, if the context atom is requested by an application internal to the mobile terminal, such as, for example, user application 112 or any other application associated with processor 66, the context atom is typically transmitted by the context engine through the context API 106. If the context atom is requested by an external application, however, the context atom is typically transmitted by the context API 106 to the communications manager 120, which will then transmit the context atom over a communications link in accordance with the context exchange protocol.

If the context consumer does not have permission to retrieve the requested context atom, however, the context atom is not transmitted to the context consumer. In such instances, the context engine 102 can transmit a message to the context consumer indicating that permission to retrieve the context atom was denied, if so desired. In case of a request received from an external application or device in accordance with the context exchange protocol, the request may be dropped silently, such as in the case of an error or a resend request. In other terms, the context engine can merely ignore the request, and therefore not transmit a response to the context consumer.

In addition to retrieving context atoms, context consumers may also be notified when particular context atoms change, such as when particular context atoms are added to the blackboard 108, removed from the blackboard, and/or otherwise modified. In addition, the context consumers can also specify the extent of a change required before the respective context consumer is notified of the respective change. To receive notifications of changes to particular context atoms, context consumers may subscribe to particular context atoms by requesting to be placed on a notification list for one or more context atoms. As such, when the content of the respective context atom(s) contents change or expire, the context engine 102 can issue a notification to the context consumer. As will be appreciated, however, the context engine will typically check with the privacy engine 118 to determine if the consumer is allowed to receive such notifications. Thereafter, the context engine can keep the context consumer notified of any changes by transmitting a notification to the context consumer following each such change or expiration of the respective context atoms. Whereas any of a number of changes can require notification, the context engine typically transmits a notification in the event of the appearance and disappearance of an atom, change of an atom contents, and/or termination of the subscription.

Once a context consumer retrieves one or more context atoms, the context consumer can utilize the context atoms to determine a context of the mobile terminal 10 (or the user of the mobile terminal), such that the mobile terminal, for example, can be operated based upon the determined context. In this regard, the context consumer can determine a context of the mobile terminal, or more particularly the user of the mobile terminal, based upon requested context atoms, and thereafter transmit the context back to the mobile terminal such that the mobile terminal can perform one or more actions based upon the context including, for example, the generation and display of a dream-like presentation that may reflect the mood of the user, as described below. As another example, the context information can be utilized to configure the mobile terminal based upon the determined context, such as by changing the volume of the mobile terminal according to ambient noise (physical context), changing menus displayed by the mobile terminal according to whether a user is with a digital tribe associated with the user (social context), and/or highlighting email messages that have the same context as an email displayed by the mobile terminal (subject context). For more information on the context exchange architecture, see U.S. patent application Ser. No. 10/817,401, entitled "System, Mobile Station and Method for Managing Context-Related Information" filed on Apr. 2, 2004 (claiming priority to U.S. Provisional Application No. 60/460,316, filed on Apr. 3, 2003), the contents of which are hereby incorporated by reference in its entirety.

For more information on methods and techniques for acquiring, storing and presenting context related data, please refer to U.S. patent application Ser. No. 11/026,663, entitled "Context Diary Application for a Mobile Terminal" filed on Dec. 31, 2004, in the name of inventors Younghee Jung, Per Persson, Petri Piippo, and Petri H. Mäenpää and assigned to the same inventive entity as the present invention. That application is herein incorporated by reference as if set forth fully herein.

Generation of Dream-Like Presentation

FIG. 4 provides a flow chart of the steps generally performed by a mobile terminal and, more particularly, a processor of the mobile terminal, upon execution of a computer program product for creating a dream-like presentation using the contextual information discussed above in accordance with exemplary embodiments of the present invention. As such, the various embodiments of the present invention function as a context consumer. It should be noted that while one embodiment for collecting, storing and accessing context data elements, such as context atoms, are described above, embodiments of the present invention can utilize context data elements that may have been collected, stored and accessed, or otherwise provided, in other manners, if so desired.

As stated above, the presentation may provide the user with a snapshot of things that are, or have been, on the user's mind, as well as things buried in the user's subconscious. The content, style and tone of the presentation may be based, at least in part, on the contextual information acquired, stored and accessed in the manner discussed above, or in any other comparable manner. The data elements that may be included in the presentation include, for example, contact information (e.g., names, email addresses, phone numbers, photos, videos, messages, etc.), messages (e.g., SMS messages, emails, etc.), audio files (music, ring tones, recorded phone calls, audio messages, recorded voices, etc.) photos or videos (downloaded, taken or received), calendar entries (e.g., appointments, birthdays, anniversaries, etc.), text (e.g., messages, documents, notes, etc.), data relating to games (e.g., saved situations, goals, characters, moves or actions taken, etc.), metadata and context information (e.g., temperature, astrological symbols, location information, etc.), technical information (e.g., devices nearby, connections, status of battery, etc.), graphics (e.g., symbols or text), characters (e.g., tamagotchis, avatars, etc.), and data collected from external sources (e.g., advertisements, weather forecasts, offerings, happenings, news, etc.).

The process begins at Step 401, where the temporal scope of the presentation may be determined. In other words, it may be determined over what time period (e.g., days, weeks, months, etc.) the presentation will cover. For example, the presentation may provide the user with a snapshot of key details from the previous and next day, or, alternatively, it may provide images based on the previous and next week or month. In one exemplary embodiment, the period of time over which the presentation covers is determined by the user upon installing the computer program product of the present invention (i.e., the Device Dream application) into his or her mobile terminal, or other digital device. Alternatively, the period of time may be determined in other manners including based upon a predefined default value that may be changed by the user.

Once the temporal scope of the presentation is determined, in one embodiment, the relative importance of context data elements (i.e., contextual information) falling within the designated time period is determined (Step 402). As stated above, relative importance may be based, for example, on the frequency with which certain context data elements are accessed, or on the level of significance or importance assigned to the context data element by the user. For example, recall that context data includes, among other things, files received and created by the user, including emails, voicemails, short message service (SMS) messages, etc, and calendar entries. Where a user sends or receives an email or a SMS message to one person more frequently than anyone else, more than a predefined number of times, or more than in the previous time periods, context data related to those emails or calls would be more important than context data related to emails or SMS messages sent to or received from others that occurred less frequently. Similarly, where the user marks an email or calendar entry as "URGENT" or of "HIGH IMPORTANCE," this would clearly indicate that this context data was relatively important.

In one exemplary embodiment, the user may also indicate that certain context data should always be viewed as highly important. For example, the user may specify that context data related to the temperature outside, or his or her blood pressure, is always important. In another embodiment, relative importance may be based on the time period in which the context data elements originate. For example, the user may indicate that all context data elements relating to the selected period of time over which the presentation covers are of the same importance, and that all context data elements from other time periods are of lesser importance or, more commonly, of no importance. In this embodiment, all of the data elements included in the presentation would be selected from data elements relating to the selected time period, such as the most recent context data elements from the selected period of time. Alternatively, the specified period of time need not correspond with that of the presentation, and the user may specify that all context data elements corresponding to a specific period of time that is shorter than but within the period of time over which the presentation covers are important. For example, the presentation may cover all events or things relating to the previous and next week, but the user may specify that all context data relating to the previous day should have a higher importance.

After determining the relative importance of context data elements, in Step 403 of exemplary embodiments of the present invention, the Device Dream application determines what proportion of the presentation should include data elements that were selected based on the relative importance of the context data, and what proportion, if any, should include randomly selected data elements. In one exemplary embodiment, this determination is based upon how many, and to what extent, various context data elements are determined to be of a higher importance than other context data elements. For example, in one instance a user may have not called anyone with any particular frequency, or marked any emails or calendar entries as "URGENT" or of "HIGH IMPORTANCE." In this case, most, if not all, of the data elements included in the presentation would be randomly selected. In contrast, on another given day (or week or month) the user may have called his or her brother five times as many times as anyone else, his or her sister two times more, and marked several meetings as urgent. In this instance, the presentation would likely include several data elements that are selected because of the relative importance of that context data. In another exemplary embodiment, the percentage of specifically selected versus randomly selected data elements may be predefined by the user and, therefore, remain the same for all presentations created; at least until the user redefined the ratio. In the embodiment in which the relative importance of the context data elements is based upon the context data elements originating, or otherwise being associated with, a specified period of time, all of the context data elements for the presentation may be selected randomly, or some may be selected randomly while others are selected in accordance with an importance criteria, such as the most recent context data elements from the specified time period.

In Step 404, a group of data elements is then selected to include in the presentation based on the relative importance of context data and the proportions determined in the previous steps. In the instance where a particular context data element is determined to be relatively important, one or more data elements associated with that context data element will be selected to include in the presentation. As used herein, data elements refer to actual data such as the context atoms, while context data elements are groupings of data elements having a common context. In one embodiment, the number of data elements selected for each context data element that is viewed as important depends on just how important that context data element is or appears to be to the user. For instance, consider the scenario above where the user called his or her brother five times more than anyone else, while calling his or her sister only two times more than anyone else within the designated time period. In this example, the presentation may include a photo, a video clip, and an email address associated with the user's brother, while including only a phone number associated with his or her sister. Another example would be where the user has more than a predefined number of work appointments scheduled for a given day or week. In this instance, according to one exemplary embodiment, the presentation may include one or more pictures of either the user's office (which were taken by the user) or a generic office building (which may have been downloaded off the Internet).

This step also optionally involves randomly selecting data elements from those stored in or accessible by the mobile terminal, where the number of randomly selected data elements relative to those selected based upon the relative importance of the context data elements is dictated by the ratio described above. In one exemplary embodiment, the randomly selected data elements are in no way limited by the temporal scope of the presentation determined in Step 401. In other words, the Device Dream application may select a data element such as a phone number or email address that has not been used in months or years, or select a photo from a vacation taken over a year ago. The purpose of these elements is to provide the user with a snapshot of things that may be buried in his or her subconscious in an effort to jog the user's memory on something he or she may have forgotten.

Next, in Step 405, the user's mood is determined. As described above, in one exemplary embodiment, the user's mood is determined based on contextual information relating to the mobile terminal and, therefore, the mobile terminal user. For example, where the user is on vacation, which can be determined, for instance, by the location of the mobile terminal (e.g., Maui), or from calendar entries, the Device Dream application will likely determine that the user is relaxed or happy. In contrast, where the user is on a business trip during which there are several highly important meetings scheduled (as indicated, for example, by calendar entries and the location of the mobile terminal), the user may be determined to be stressed or tired.

Once the user's mood is determined, the dream-like multimedia presentation is generated by combining the data elements selected in Step 404 with one or more media components in a manner that is reflective of the user's mood (Step 406). In one exemplary embodiment, this involves determining the tempo at which the data elements should be displayed (e.g., fast when the user is stressed or slow when the user is relaxed). In another exemplary embodiment, this involves determining what colors will be used throughout the presentation. In yet another exemplary embodiment this involves selecting one or more audio or music files to play during the presentation, wherein the audio or music files are divided into categories corresponding to various moods of the user. For instance, one category of music files may include only fast-paced heavy metal or techno music to be used when the user is determined to be stressed or unhappy. Similarly, various graphics, such as symbols (e.g., hearts, arrows, lightning rods, etc.) or text (e.g., "Don't Worry Be Happy," "A day without laughter is a day wasted," or "Friendship is always a sweet responsibility, never an opportunity"), that belong to a category corresponding to the user's mood may be selected. For instance, a picture of a rainy day that is stored in or accessible by the mobile terminal may be used when the user is grumpy or tired, or the phrase "Patience is a virtue" may be displayed where the user has a hectic day and is therefore stressed.

In other exemplary embodiments, media components that correspond directly to various elements of contextual information, and not more generally to the user's mood, may also be selected to include in the presentation. For example, as described above, where the temperature outside is cold, the Device Dream application may select a picture that was either taken by the user or downloaded from, for example, the Internet, of a snowy mountain to include in the presentation. Similarly, if the mobile terminal is located on some island in the Caribbean, the presentation may include a picture of a sunny beach, and/or Reggae music playing in the background. If it is the user's anniversary, the presentation may include numerous hearts and the use of the color red.

In yet another exemplary embodiment of the present invention, the tone and content of the presentation may vary to some extent based on some aspect or condition of the mobile terminal itself. For example, where the mobile terminal battery is low and needs to be recharged, the tone of the presentation may be frantic or hectic indicating that the user needs to take some action. The presentation may also include graphics that symbolize a low battery, or some other service or part that needs attending to.

As described above various exemplary embodiments of the present invention provide a method, computer program product and a device for providing the user with a dream-like multimedia presentation that corresponds to the user's mood and includes what appears to be on the user's mind and/or buried in the user's subconscious. Although not intended to be limiting, but instead exemplary, the embodiments of the present invention may be embodied as computer program instructions, i.e., the Device Dream application, stored on a computer-readable medium, such as a memory device within or otherwise accessible by a mobile terminal, or other digital device. A mobile terminal, or other digital device, such as a processor therein, can, therefore, execute the computer program product to generate the dream-like presentation described above. The presentation can be accessed by the user, saved and even sent to other digital devices. FIG. 5 illustrates four screenshots or views from an exemplary presentation created in accordance with an exemplary embodiment of the present invention.

In one exemplary embodiment, the presentation may be generated at the end of each day and presented to the user when he or she wakes up. For instance, the mobile terminal may include a user interface that prompts the user each morning asking whether he or she wishes to view his or her device's dream from the preceding night. The user can then select to see his or her device's dream and view the multimedia presentation on the mobile terminal display. In other exemplary embodiments, the presentation may be generated at regular intervals and presented to the user each time the mobile terminal goes into idle mode.

In yet another exemplary embodiment, the Device Dream application of the present invention may be linked to a gaming application operating on the user's mobile terminal, or other digital device. In this embodiment, the application gathers data on previously played situations, moves or actions, along with never or rarely played moves or actions, and provides the user with a presentation of these moves or actions, based on their relative importance (e.g., this move hasn't been used in X months, or this move was successful Y times), in a dream-like manner. In one exemplary embodiment, the presentation is displayed on the mobile terminal each time the user opens the game, or, alternatively, each time the user pauses the game. This exemplary embodiment could, therefore, operate as a teaching mechanism to the user, showing him or her moves he or she could make.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, although the above-described embodiments initially determined the relevant time period for the presentation in Step 401 of FIG. 4, the time period need not be predefined and a predetermined number of the most recent data elements or all of the data elements may be considered for inclusion in the presentation regardless of the period of time associated therewith. Although specific terms are employed herein, they are used in a generic and descriptive sense only and not for purposes of limitation.

That which is claimed:

1. A method comprising:
    capturing a heterogeneous plurality of context data elements comprising three or more emails, messages, voicemails, image files or video files, or a combination thereof, generated or received by an electronic device, wherein respective context data elements have a time at which said context data element was generated or received;
    receiving an indication of a desired temporal scope of a presentation to be generated based at least in part on said plurality of context data elements, said temporal scope defining a time period to be represented by said presentation;
    identifying a subset of said plurality of context data elements, said subset comprising two or more context data elements generated or received at a time within said time period defined by said desired temporal scope, said subset comprising less than said plurality of context data elements;
    determining a relative importance of respective context data elements from among said subset of said plurality of context data elements based upon one or more of a number of instances that respective context data elements have been utilized, a level of significance associated with respective context data elements, and a period of time associated with respective context data elements;
    selecting a combination of two or more context data elements from said subset of said plurality of context data elements, wherein at least a portion of said combination is selected based on said relative importance of said respective context data elements;
    selecting a mood associated with a user from a plurality of predefined moods based at least in part on an analysis of one or more of said plurality of context data elements captured;
    selecting one or more media elements from a plurality of media elements each of said plurality of media elements belonging to one or more of a plurality of categories of media elements each category corresponding to a predefined mood, wherein the media elements comprise audio elements, graphical elements, or a combination thereof, wherein the audio elements are categorized based at least in part on one or more of volume, tone, tempo, and musical genre, and the graphical elements are categorized based at least in part on one or more of color, tone, and brightness, and wherein at least one of said one or more media elements is selected from the category of media elements corresponding to said mood associated with said user; and
    generating said presentation, wherein said presentation comprises said combination of two or more context data elements, and wherein generating said presentation comprises compiling said combination of two or more context data elements with said one or more media elements.

2. The method of claim 1, wherein selecting the combination comprises randomly selecting one or more data elements, such that a first portion of said presentation comprises one or more data elements selected based on said relative importance of said respective context data elements, and a second portion of said presentation comprises one or more randomly selected data elements.

3. The method of claim 2 further comprising:
    determining a ratio of said one or more data elements in said first portion of said presentation to said one or more data elements in said second portion based on said relative importance of said respective context data elements.

4. The method of claim 2, wherein generating said presentation comprises generating a multimedia presentation comprising a combination of one or more media elements.

5. The method of claim 1, wherein compiling said combination of two or more context data elements with said one or more media elements comprises defining a tempo at which said one or more context data elements and said one or more media elements are displayed in said multimedia presentation based on the mood associated with the user.

6. The method of claim 1, wherein said combination of two or more context data elements comprises one or more data elements related to a user's past, present or future.

7. The method of claim 1, wherein said plurality of context data elements comprises some combination of data related to a location of a mobile terminal, an environment of said mobile terminal, one or more files created by said mobile terminal, one or more files received by said mobile terminal, one or more calendar entries stored in said mobile terminal, and one or more health related parameters associated with a user of said mobile terminal.

8. A computer program product, wherein the computer program product comprises at least one computer-readable storage medium having computer-readable program code portions stored therein, the computer-readable program code portions comprising:

a first executable portion for capturing a heterogeneous plurality of context data elements comprising three or more emails, messages, voicemails, image files or video files, or a combination thereof, generated or received by an electronic device, wherein respective context data elements have a time at which said context data element was generated or received;

a second executable portion for receiving an indication of a desired temporal scope of a presentation to be generated based at least in part on said plurality of context data elements, said temporal scope defining a time period to be represented by said presentation;

a third executable portion for identifying a subset of said plurality of context data elements, said subset comprising two or more context data elements generated or received at a time within said time period defined by said desired temporal scope, said subset comprising less than said plurality of context data elements;

a fourth executable portion for determining a relative importance of respective context data elements from among said subset of said plurality of context data elements based upon one or more of a number of instances that respective context data elements have been utilized, a level of significance associated with respective context data elements, and a period of time associated with respective context data elements;

a fifth executable portion for selecting a combination of two or more context data elements from said subset of said plurality of context data elements, wherein at least a portion of said combination is selected based on said relative importance of said respective context data elements;

a sixth executable portion for selecting a mood associated with a user from a plurality of predefined moods based at least in part on an analysis of one or more of said plurality of context data elements captured;

a seventh executable portion for selecting one or more media elements from a plurality of media elements each of said plurality of media elements belonging to one or more of a plurality of categories of media elements each category corresponding to a predefined mood, wherein the media elements comprise audio elements, graphical elements, or a combination thereof, wherein the audio elements are categorized based at least in part on one or more of volume, tone, tempo, and musical genre, and the graphical elements are categorized based at least in part on one or more of color, tone, and brightness, and wherein at least one of said one or more media elements is selected from the category of media elements corresponding to said mood associated with said user; and an eighth executable portion for generating said presentation, wherein said presentation comprises said combination of two or more context data elements, and wherein generating said presentation comprises compiling said combination of two or more context data elements with said one or more media elements.

9. The computer program product of claim 8, wherein selecting the combination comprises randomly selecting one or more data elements, such that a first portion of said presentation comprises one or more data elements selected based on said relative importance of said respective context data elements, and a second portion of said presentation comprises one or more randomly selected data elements.

10. The computer program product of claim 9, wherein said computer-readable program code portions further comprise:

a ninth executable portion for determining a ratio of said one or more data elements in said first portion of said presentation to said one or more data elements in said second portion based on said relative importance of said respective context data elements.

11. An apparatus comprising:

a processor configured to:

capture a heterogeneous plurality of context data elements comprising three or more emails, messages, voicemails, image files or video files, or a combination thereof, generated or received by an electronic device, wherein respective context data elements have a time at which said context data element was generated or received;

receive an indication of a desired temporal scope of a presentation to be generated based at least in part on said plurality of context data elements accessible by the apparatus, said temporal scope defining a time period to be represented by said presentation;

identify a subset of said plurality of context data elements, said subset comprising two or more context data elements generated or received at a time within said time period defined by said desired temporal scope, said subset comprising less than said plurality of context data elements;

determine a relative importance of respective context data elements from among said subset of said plurality of context data elements based upon one or more of a number of instances that respective context data elements have been utilized, a level of significance associated with respective context data elements, and a period of time associated with respective context data elements;

select a combination of two or more context data elements from said subset of said plurality of context data elements, wherein at least a portion of said combination is selected based on said relative importance of said respective context data elements;

select a mood associated with a user from a plurality of predefined moods based at least in part on an analysis of one or more of said plurality of context data elements captured;

select one or more media elements from a plurality of media elements each of said plurality of media elements belonging to one or more of a plurality of categories of media elements each category corresponding to a predefined mood, wherein the media elements comprise audio elements, graphical elements, or a combination thereof, wherein the audio elements are categorized based at least in part on one or more of volume, tone, tempo, and musical genre, and the graphical elements are categorized based at least in part on one or more of color, tone, and brightness, and wherein at least one of said one or more media elements is selected from the category of media elements corresponding to said mood associated with said user; and generate said presentation, wherein said presentation comprises said combination of two or more context data elements, and wherein generating said presentation comprises compiling said combination of two or more context data elements with said one or more media elements.

12. A mobile terminal device comprising:

a display;

a processor in communication with the display; and a memory module in communication with the processor that stores a plurality of data elements including a heterogeneous plurality of context data elements, said plurality of context data elements comprising three or more emails, messages, voicemails, image files or video files, or a combination thereof, generated or received by the mobile terminal device, said memory module further storing a presentation application executable by the processor, wherein the application is configured, upon execution, to:

receive an indication of a desired temporal scope of a presentation to be generated based at least in part on said plurality of context data elements, said temporal scope defining a time period to be represented by said presentation;

identify a subset of said plurality of context data elements, said subset comprising two or more context data elements generated or received by the mobile terminal device at a time within said time period defined by said desired temporal scope, said subset comprising less than said plurality of context data elements;

determine a relative importance of respective context data elements from among said subset of said plurality of context data elements based upon one or more of a number of instances that respective context data elements have been utilized, a level of significance associated with respective context data elements, and a period of time associated with respective context data elements;

select a combination of two or more context data elements from among said subset of said plurality of data elements based at least in part on said relative importance of respective context data elements;

select a mood associated with a user from a plurality of predefined moods based at least in part on an analysis of one or more of said plurality of context data elements;

select one or more media elements from a plurality of media elements each of said plurality of media elements belonging to one or more of a plurality of categories of media elements each category corresponding to a predefined mood, wherein the media elements comprise audio elements, graphical elements, or a combination thereof, wherein the audio elements are categorized based at least in part on one or more of volume, tone, tempo, and musical genre, and the graphical elements are categorized based at least in part on one or more of color, tone, and brightness, and wherein at least one of said one or more media elements is selected from the category of media elements corresponding to said mood associated with said user;

generate said presentation comprising said combination of two or more context data elements, wherein generating said presentation comprises compiling said combination of two or more context data elements with said one or more media elements; and cause said presentation to be displayed to said user on the display.

13. The apparatus of claim 11, wherein said processor is further configured to randomly select one or more data elements and to generate said presentation based at least in part on said one or more randomly selected data elements.

14. The apparatus of claim 11 wherein at least a portion of said plurality of context data elements comprises one or more context data elements sensed by one or more sensors.

15. The apparatus of claim 11, wherein the processor is further configured to generate one or more context data elements, and wherein at least a portion of said plurality of context data elements comprises said one or more generated context data elements.

16. The apparatus of claim 11, wherein the processor is further configured to receive, via wireless communication with external elements, one or more context data elements, wherein at least a portion of said plurality of context data elements comprises said one or more context data elements received from said external elements.

17. An apparatus comprising:

means for capturing a heterogeneous plurality of context data elements comprising three or more emails, messages, voicemails, image files or video files, or a combination thereof, generated or received by said mobile terminal device, wherein respective context data elements have a time at which said context data element was generated or received;

means for receiving an indication of a desired temporal scope of a presentation to be generated based at least in part on said plurality of context data elements accessible by said mobile terminal device, said temporal scope defining a time period to be represented by said presentation;

means for identifying a subset of said plurality of context data elements said subset comprising two or more context data elements generated or received at a time within said time period defined by said desired temporal scope, said subset comprising less than said plurality of context data elements;

means for determining a relative importance of respective context data elements from among said subset of said plurality of context data elements based upon one or more of a number of instances that respective context data elements have been utilized, a level of significance associated with respective context data elements, and a period of time associated with respective context data elements;

means for selecting a combination of two or more context data elements from among said subset of said plurality of data elements based at least in part on said relative importance of respective context data elements;

means for selecting a mood associated with a user from a plurality of predefined moods based at least in part on an analysis of one or more of said plurality of context data elements captured;

means for selecting one or more media elements from a plurality of media elements each of said plurality of media elements belonging to one or more of a plurality of categories of media elements each category corresponding to a predefined mood, wherein the media elements comprise audio elements, graphical elements, or a combination thereof, wherein the audio elements are categorized based at least in part on one or more of volume, tone, tempo, and musical genre, and the graphical elements are categorized based at least in part on one or more of color, tone, and brightness, and wherein at least one of said one or more media elements is selected from the category of media elements corresponding to said mood associated with said user; and means for generating a presentation comprising said combination of two or more context data elements, wherein generating said presentation comprises compiling said combination of two or more context data elements with said one or more media elements.

18. The apparatus of claim 17 further comprising:

means for randomly selecting one or more data elements, wherein generating said presentation further comprises generating said presentation based at least in part on said one or more randomly selected data elements.

* * * * *